Figures 8, 9, 10:
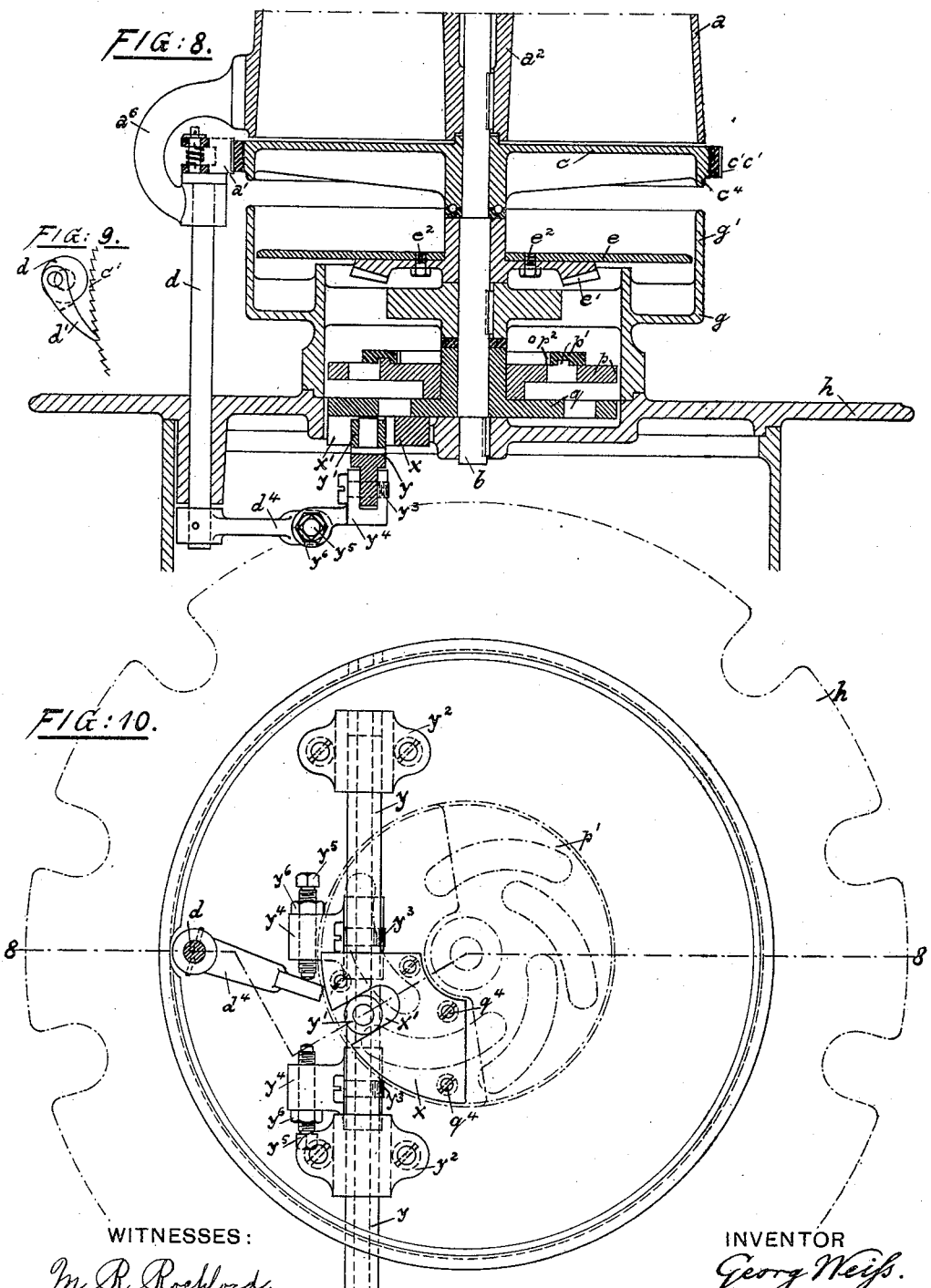

No. 611,302. Patented Sept. 27, 1898.
G. WEISS.
FEEDING DEVICE FOR NUT TAPPING MACHINES.
(Application filed Oct. 25, 1897.)
(No Model.) 4 Sheets—Sheet 1.
FIG: 1.
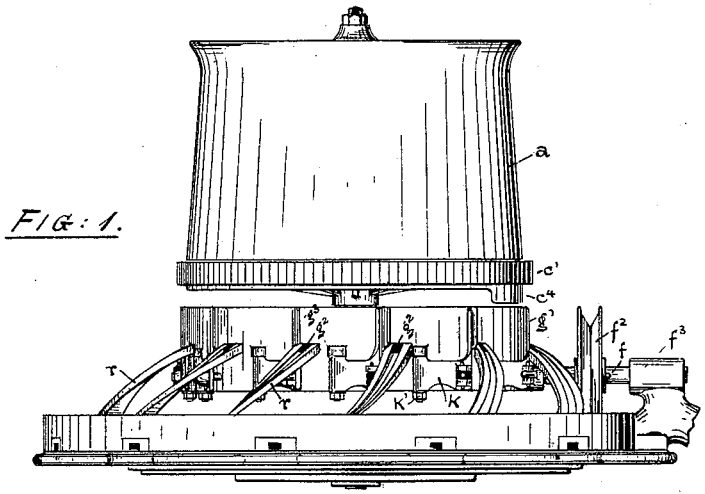
FIG: 2.
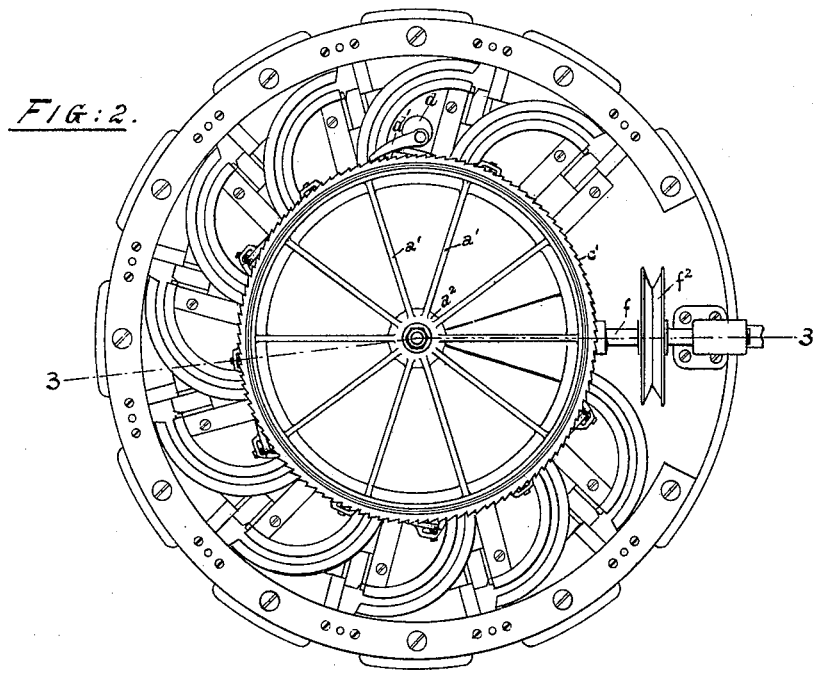
WITTNESSES:
INVENTOR:
Georg Weiss.
BY Ludington & Jones
ATTORNEYS

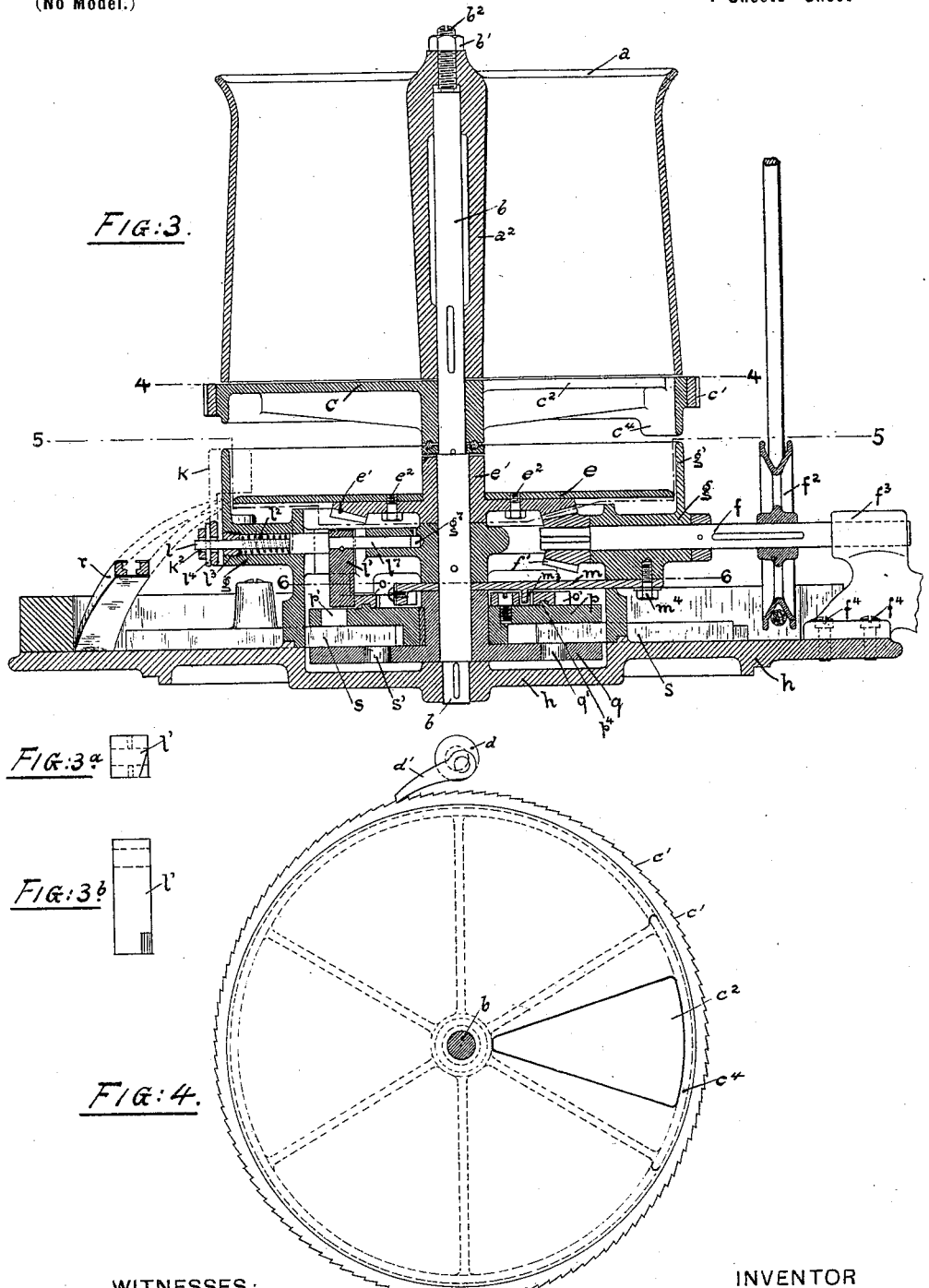

No. 611,302. Patented Sept. 27, 1898.
G. WEISS.
FEEDING DEVICE FOR NUT TAPPING MACHINES.
(Application filed Oct. 25, 1897.)
(No Model.) 4 Sheets—Sheet 3.
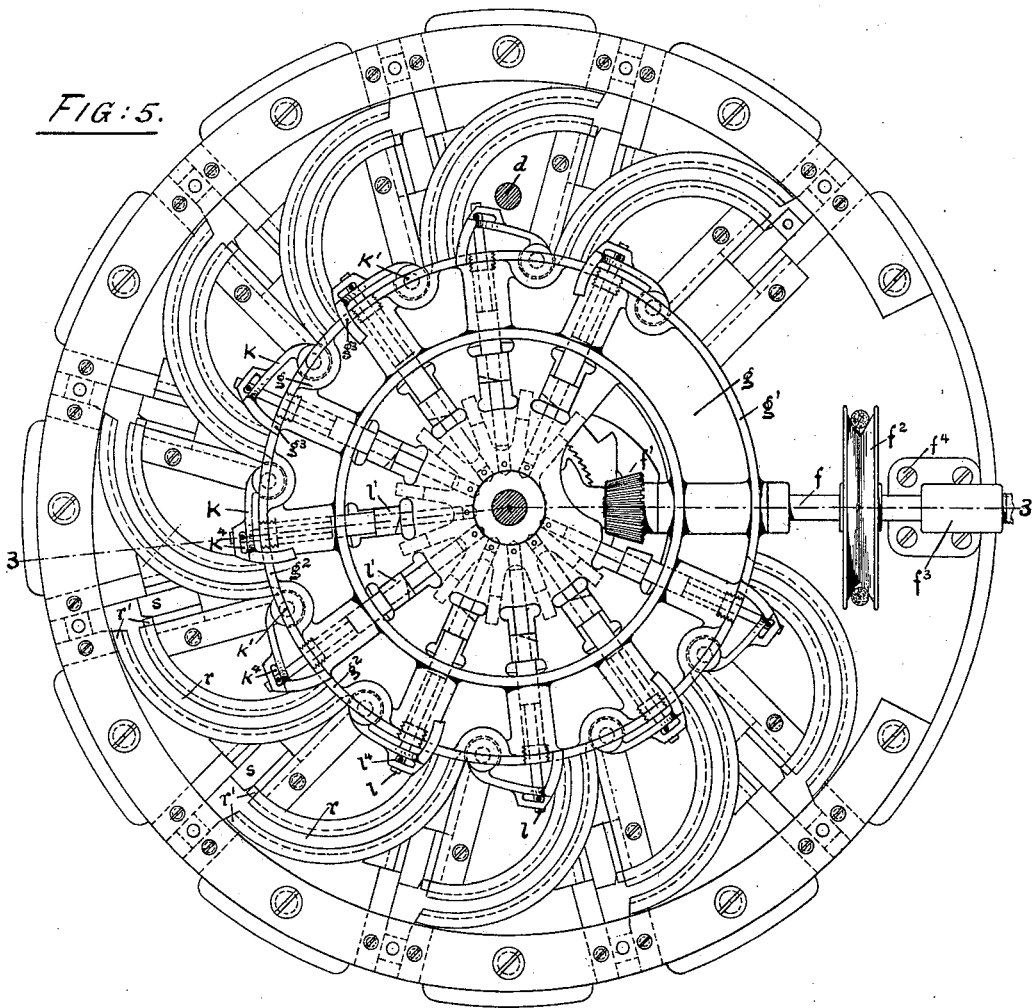
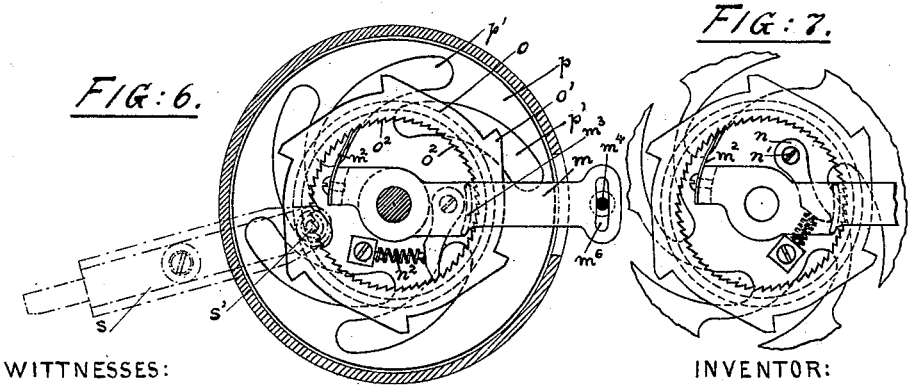
WITTNESSES: INVENTOR:
Georg Weiss.
BY
Ludington & Jones,
ATTORNEYS.

No. 611,302. Patented Sept. 27, 1898.
G. WEISS.
FEEDING DEVICE FOR NUT TAPPING MACHINES.
(Application filed Oct. 25, 1897.)
(No Model.) 4 Sheets—Sheet 4.

WITNESSES:
M. R. Rockford.
William A. Irins

INVENTOR
Georg Weiss.
BY
Ludington & Jones,
ATTORNEYS.

UNITED STATES PATENT OFFICE.

GEORG WEISS, OF CHICAGO, ILLINOIS.

FEEDING DEVICE FOR NUT-TAPPING MACHINES.

SPECIFICATION forming part of Letters Patent No. 611,302, dated September 27, 1898.

Application filed October 25, 1897. Serial No. 656,296. (No model.)

*To all whom it may concern:*

Be it known that I, GEORG WEISS, a citizen of the United States, residing at Chicago, in the county of Cook and State of Illinois, have invented a certain new and useful Improvement in Feeding Devices for Nut-Tapping Machines, of which the following is a full, clear, concise, and exact description, reference being had to the accompanying drawings, forming a part of this specification.

My invention relates to improvements in the feeding device for nut-tapping machines, my object being to provide a compact, positive, and efficient device for automatically feeding blank nuts into position to be tapped.

My invention relates more particularly to an improvement in the feeding device for a nut-tapping machine, for which I have filed an application for Letters Patent, Serial No. 623,501, dated February 15, 1897. I have shown and described herein only such parts of the machine as embody the improvements herein contemplated.

In the art to which this invention relates it has been customary to have an oscillating feed-disk distributing to inclined chutes. The chutes feed the blanks into the paths of the pushers or feed-plates from above the pushers. This arrangement necessitates the use of retarding or retaining springs and feed-springs to properly control the blanks from massing and jamming, while in the device of the present invention by means of downward laterally-deflected chutes the blanks are introduced into the plane and the path of the pusher or feed plate directly from the chute and from the side, thus doing away with the use of controlling-springs, &c., and making a positive and effective automatic feeding device.

In the present invention in the preferred form I provide for holding the blank-nuts a stationary vertically-partitioned receiver or hopper having a movable bottom with an opening therein arranged to pass successively under each compartment of the hopper and to thereby allow a certain number of the blanks to fall upon a revolving distributing-plate, which has, near its periphery and above its surface, movable agitating-arms to prevent the packing and jamming of the blanks and to permit the same to readily pass to the feed-chutes. The feed-chutes extend from the periphery of the distributing-plate downwardly and in a laterally-deflected direction to the plane of the pushers, whereby the blanks are laterally or transversely introduced into the path of the pusher and then carried forward to the tapping-table.

In the accompanying drawings, Figure 1 is a side elevation of my invention. Fig. 2 is a plan view of same. Fig. 3 is a sectional view on line 3 3, Fig. 2. Figs. $3^a$ and $3^b$ are detail views of the reciprocating blocks actuating the agitating-arms. Fig. 4 is a plan view of the movable bottom of the hopper. Fig. 5 is a plan view of the machine on line 5 5, Fig. 3. Fig. 6 is a plan view of the cam-wheel which actuates the agitating-arms at the periphery of the revolving distributing-plate. Fig. 7 is a partial view of the same with the pawl in its initial position. Fig. 8 is a sectional view, line 8 8, Fig. 10, showing mechanism for rotating hopper-bottom. Fig. 9 is a detail view of pawl for same. Fig. 10 is a plan view below the supporting-plate $h$, showing mechanism for oscillating rod to rotate hopper-bottom.

Like letters refer to like parts in the several figures.

A hopper $a$, divided into compartments by the radial partitions $a'\,a'$, has a center or hub $a^2$, through which is passed the stationary supporting shaft or rod $b$. The hopper $a$ may be vertically adjusted by means of the screw $b^2$ resting upon the end of the shaft $b$ and supporting the hopper. The locking-nut $b'$ locks the hopper in the desired adjusted position. Below the hopper $a$ and journaled on the supporting-rod $b$ is the revolving bottom $c$, having on its periphery the series of teeth $c'\,c'$, adapted to be engaged by the pawl $d'$, eccentrically mounted on the oscillating vertical rod or shaft $d$. Through the bottom $c$ is the opening $c^2$. The guard $c^4$ is provided on the under side of the bottom along the edge and upon the outer side of the opening $c^2$. Below the bottom $c$ and journaled to the supporting-rod $b$ is the bevel-gear $e'$, to the upper side of which is attached by the screws $e^3\,e^3$ the rotating distributing disk or plate $e$. Below the bevel-gear $e'$ is the bearing-plate $g$, through the rear side of which is journaled the shaft $f$, carrying on its forward end the bevel-pinion $f'$, which is adapted to engage the bevel-gear $e'$. Near the rear end of the shaft $f$ is the sheave-pulley $f^2$ or other device by means of which power is furnished for continuously rotating the distributing-plate $e$. At the extreme rear end of the rod $f$ is the bearing $f^3$, attached to the supporting-plate $h$ by the screws $f^4 f^4$. The bearing plate or standard $g$ has the upwardly-extending circular wall $g'$, surrounding the distributing-plate $e$. In the wall $g'$ (except on the rear side where space is left for the operation of the driving mechanism) and substantially equidistant from each other are the openings $g^2 g^2$, coincident with openings or passage-ways in the upper ends of the feeding-chutes $r r$. At the sides of the openings $g^2 g^2$ are the slots or openings $g^3 g^3$, through which operate the agitating-arms $k k$. The arms $k k$ are pivoted at their ends $k' k'$ to the bearing-plate $g$ and carry the slots or channels $k^2 k^2$. The actuating-rods $l l$ extend through the slots $k^2 k^2$ of the arms $k k$, being attached to the rods by means of the pins $l^4 l^4$, which slide in the slots $k^4 k^4$, whereby the arms are rocked by the reciprocation of the rods $l l$.

Journaled on the supporting-shaft $b$, immediately above the supporting-plate $h$, are the cam-plates $p q$, keyed together and adapted to be oscillated. In the cam-plates are the eccentric slots or cam-grooves $p' p' q' q'$, which engage the rollers $s' s'$ of the pushers $s s$. Each alternate pusher is in engagement with the same cam-plate, one half of the pushers having their rollers extending upward and the other half having rollers extending downward into engagement with the cam-grooves.

Journaled to the circular projecting ring $p^4$ on the upper surface of the cam-plate $p$ is the annular cam-wheel $o$, having large exterior teeth or cams $o' o'$ and small interior ratchet-teeth $o^2 o^2$. Within the cam-wheel $o$ and attached to the oscillating cam-plate $p$ by means of the screw $n'$ is the pawl $n$, adapted to be held into contact with the interior teeth $o^2 o^2$ by the coiled spring $n^2$. The oscillation of the cam-plate $p$ causes the cam-wheel $o$ to travel in a right-hand direction. The friction of the cam-plate $p$ and the pawl $n$ on their return tend to carry the cam-wheel back, and in order to prevent this and to provide a positive and equal advance of the ratchet in its rotation I provide a pivoted lever $m$, loosely journaled on the supporting-shaft $b$ between the bearing-plate $g$ and the cam-plate $p$ and held in any adjusted position by the set-screw $m^4$, passing through a slot $m^6$ at the rear end of the lever and screwing into the supporting plate or standard $g$. On the forward end of the lever is carried the spring or detent $m^2$, arranged to be constantly in contact with the teeth $o^2$ of the cam-wheel, and thereby prevent the backward movement.

In the operation of the machine it is desirable to have the cam-wheel $o$ advance but half the distance between the teeth $o'$ during each oscillation of the cam-plate. As the cam-plate $p$ moves through a greater arc than that desired it is necessary to cut out a part of this movement. This is done by means of the downward projection or shield $m^3$ on the under face of the lever $m$, which is so adjusted by means of the set-screw $m^4$ and the slot $m^6$ in the lever $m$ that the teeth $o^2$ are protected from engagement with the pawl $n$ by the shield $m^3$ during a part of the travel of the pawl. Fig. 7 shows the pawl $n$ in the beginning of its stroke, wherein it rests upon the shield $m^3$ out of engagement with the teeth $o^2$, while Fig. 6 shows the pawl $n$ at the finish of its stroke. I preferably adjust the parts so that the cam-plate, and consequently the pawl $n$, move through a distance equal to the pitch or distance between the teeth $o'$, while the pawl $n$ rests upon the shield $m^3$ and out of engagement with the teeth during the first half of its travel and engages the teeth and advances the ratchet-wheel $o$ during the last half of its travel.

Against the exterior edge of the cam-wheel $o$ and adapted to be reciprocated by the teeth $o' o'$ are the radially-movable blocks $l' l'$, to which, at the upper ends, are rigidly attached the actuating-rods $l l$. Around the rod $l$ and between the block $l'$ and the bearing $l^3$ is the coiled spring $l^2$, adapted to press the rod $l$ inward and to normally keep the block $l'$ in contact with the cam-wheel. The face of the block $l'$, with which the teeth $o'$ engage, is cut away or beveled in order to make the outward advancement of the block $l'$ gradual, Figs. 3$^a$ and 3$^b$. The inner end $l^7$ of the rod $l$ slides in a bearing $g^7$ in the bearing-plate $g$.

The feeding-chutes $r r$ are gradually deflected or curved and extend from the openings $g^2 g^2$ downwardly to the supporting-table $h$, where the lower ends $r' r'$ form sides of the passages for the respective pushers $s s$. The radial pushers $s s$ are longitudinally and reciprocally operated by the cams $p q$.

In the drawings, Figs. 1 to 7, both inclusive, the details of the driving mechanism for operating the oscillating rod $d$ (shown in Figs. 8 and 10) are omitted for clearness. Cam-plates $p q$ may be oscillated by any of the known devices or methods of oscillation. To the bottom of the cam-plate $q$ is attached by the screws $q^4 q^4$ the plate $x$, having the slot or opening $x'$, extending from its outer edge inwardly toward the center of the cam-plate $q$. The projecting pin or rod $y'$, attached to the bar $y$, extends within the slot $x'$ and travels therein as the plate $x$ is oscillated with the cam-plate $q$. The bar $y$ is journaled at both ends in the boxes $y^2 y^2$ and is adapted to travel longitudinally backward and forward. To the lower part of the bar $y$ is attached by the screws $y^3 y^3$ the laterally-projecting arms $y^4 y^4$, carrying the adjusting-screws $y^5 y^5$ and the lock-nuts $y^6 y^6$ thereon. To the lower end of the oscillating rod $d$ is attached the lateral extending rod or arm $d^4$, extending inwardly and having its end $d^5$ in the same plane and between the arms $y^4 y^4$.

Near the upper end of the oscillating rod $d$ is the support $a^6$, attached to the exterior side of the hopper $a$ and extending downward in a curved direction to engage the oscillating rod $d$ below the pawl $d'$.

In the operation of the device of my invention the blank nuts are placed in the compartments of the hopper. The compartments are successively emptied by the revolving bottom moving gradually around, so that the opening therein will permit the contents of each compartment to fall in turn upon the rotating distributing-plate. The centrifugal force to which the revolving plate subjects the blanks sends the same to the periphery of the plate, where they enter the several openings $g^2 g^2$ and pass to the chutes $r\ r$. The arms $k\ k$ are advanced at intervals to agitate the blanks and prevent the packing and jamming of the same in front of the openings $g^2 g^2$, whereby the blanks may readily and continuously pass to the chutes or guideways. The blanks entering the feeding-chutes are carried by their own weight downward to the plane of the pushers and are laterally introduced one at a time in the paths of the respective pushers. The pusher moves outward and pushes the blank into position to be tapped. At the conclusion of the tapping and as the tap is retracted the pusher recedes and moves past the lower openings of the feed-chute $r$ and so allows the next blank to be introduced into the path of the pusher, which on its next advance pushes the blank ahead and dislodges the nut just tapped and inserts and holds the blank as before.

Having described my invention, what I claim as new, and desire to secure by Letters Patent, is—

1. In a feeding device, the combination with a stationary hopper having vertical compartments, of a movable bottom therefor with an opening therein, means for rotating said bottom to bring said opening successively opposite the compartments in said hopper and a rotating distributing-plate beneath the bottom of said hopper, substantially as described.

2. In a feeding device, the combination with a vertically-adjustable stationary hopper having vertical compartments, of a movable bottom therefor with an opening therein, means acting at the periphery of said bottom for rotating the same to bring said opening successively under the compartments in said hopper and a rotating distributing-plate beneath the bottom of said hopper, substantially as described.

3. In a feeding device, the combination with a stationary hopper having vertical compartments, of a rotating bottom therefor having an opening therein and carrying peripheral teeth, a propelling device engaging said teeth to rotate said bottom and a rotating distributing-plate beneath said hopper, substantially as described.

4. In a feeding device, the combination with a rotating distributing-plate, of a hopper adapted to feed blanks thereto, a wall surrounding said distributing-plate, chutes or guideways leading through said wall, and agitating-arms moving in proximity to the entrance of said chutes, substantially as described.

5. The combination with a rotating distributing-plate, of a hopper adapted to feed blanks thereon, a stationary wall surrounding said plate and having a series of openings therein for the passage of the blanks, movable agitating-arms adjacent to said openings and extending over said plate and means for actuating said agitating-arms, substantially as described.

6. The combination with a rotating distributing-plate, of a wall surrounding same and having a series of openings therein for the passage of blanks, movable agitating-arms in proximity to said openings and extending through said wall and over said plate, and means for advancing and retracting alternate agitating-arms at the same time, substantially as described.

7. The combination with a rotating distributing-plate, of a wall surrounding the same, a series of chutes or guideways leading therethrough, a centrally-located cam-wheel, reciprocating parts moved thereby, and a series of agitating-arms extending through said wall and moved in and out by said reciprocating parts, substantially as described.

8. The combination with a rotating distributing-plate and a series of outwardly-reciprocating pushers, of blank-feeding chutes or guideways starting radially from the periphery of the distributing-plate and extending therefrom downward and in a laterally-deflected direction, the outlet end of the feeding-chute extending transversely to the path of the pusher, substantially as described.

9. The combination with a rotating distributing-plate, and a series of radially-reciprocating pushers, of a series of chutes or guideways extending from the periphery of said distributing-plate downward and laterally and delivering the blanks into the path of the corresponding pusher from the side, substantially as described.

10. The combination with a rotating distributing-plate and a series of reciprocating pushers, of a series of blank-feeding chutes or guideways gradually curved laterally and starting radially from the periphery of the distributing-plate and extending downward and laterally and having the respective outlet ends thereof extending transversely to the paths of the corresponding pushers, substantially as described.

11. A stationary hopper having vertical compartments, a rotating bottom thereof having an opening therein, a rotating distributing-plate beneath the same, a wall surrounding the distributing-plate, downwardly-extending and laterally-deflected chutes or guideways leading from the periphery of said distributing-plate, agitating-arms moving over said distributing-plate in proximity to the entrances of said chutes, and reciprocating pushers moving across the lower ends of said chutes, substantially as described.

12. The combination with a rotating distributing-plate and a series of agitating-arms therefor, of an annular cam-wheel having an exterior cam-surface for reciprocating said arms and an interior set of ratchet-teeth, an oscillating plate upon which said cam-wheel is journaled to rotate a pawl engaging said teeth and carried on said oscillating plate, substantially as described.

13. The combination with a rotating distributing-plate and a series of agitating-arms therefor, of an annular cam-wheel having an exterior cam-surface for reciprocating said arms and an interior set of ratchet-teeth, an oscillating plate upon which said cam-wheel is journaled to rotate, a pawl mounted thereon and a bar carrying a shield which lifts said pawl out of engagement with said teeth during a portion of the stroke thereof substantially as described.

14. The combination with a rotating distributing-plate and a series of agitating-arms therefor, of an annular cam-wheel having an exterior cam-surface for reciprocating said arms and an interior set of ratchet-teeth, an oscillating plate upon which said cam-wheel is journaled to rotate, a pawl mounted thereon and an adjustable pivoted bar carrying a shield which lifts said pawl out of engagement with said teeth during a portion of the stroke thereof, substantially as described.

15. The combination with a rotating distributing-plate and a series of agitating-arms therefor, of an annular cam-wheel, having an exterior cam-surface for reciprocating said arms and an interior set of ratchet-teeth, an oscillating plate upon which said cam-wheel is journaled to rotate, a pawl mounted thereon, an adjustable pivoted bar carrying a shield which lifts said pawl out of engagement with said teeth during a portion of the stroke thereof, and a detent carried on said bar for preventing the backward rotation of said cam-wheel, substantially as described.

In witness whereof I have hereunto subscribed my name in the presence of two witnesses.

GEORG WEISS.

Witnesses:
W. CLYDE JONES,
R. S. LUDINGTON.